United States Patent
Rohr et al.

(10) Patent No.: US 10,472,204 B2
(45) Date of Patent: Nov. 12, 2019

(54) ELEVATOR SYSTEM HAVING A MEASURING DEVICE FOR DETERMINING A POSITION OF AN ELEVATOR CAR IN AN ELEVATOR SHAFT

(71) Applicant: CEDES AG, Landquart (CH)

(72) Inventors: Stephan Rohr, Untervaz (CH); Jan Giger, Jenaz (CH)

(73) Assignee: Cedes AG, Landquart (CH)

(*) Notice: Subject to any disclaimer, the term of this patent is extended or adjusted under 35 U.S.C. 154(b) by 270 days.

(21) Appl. No.: 15/484,303

(22) Filed: Apr. 11, 2017

(65) Prior Publication Data
US 2017/0297863 A1 Oct. 19, 2017

(30) Foreign Application Priority Data
Apr. 13, 2016 (EP) .................................... 16165173

(51) Int. Cl.
| B66B 1/34 | (2006.01) |
| B66B 1/28 | (2006.01) |
| B66B 5/00 | (2006.01) |
| B66B 9/00 | (2006.01) |
| G01B 3/10 | (2006.01) |
| G01B 11/14 | (2006.01) |

(52) U.S. Cl.
CPC .............. *B66B 1/3492* (2013.01); *B66B 1/28* (2013.01); *B66B 5/0018* (2013.01); *B66B 9/00* (2013.01); *G01B 3/1084* (2013.01); *G01B 11/14* (2013.01)

(58) Field of Classification Search
USPC .......................................................... 187/247
See application file for complete search history.

(56) References Cited

U.S. PATENT DOCUMENTS

| 4,433,756 A * | 2/1984 | Caputo ................. B66B 1/3492 |
| | | 187/394 |
| 10,059,563 B2 * | 8/2018 | Agirman ................ B66B 1/302 |
| 2003/0070883 A1 * | 4/2003 | Foster ................... B66B 1/3492 |
| | | 187/394 |
| 2013/0284544 A1 | 10/2013 | De Coi et al. |

FOREIGN PATENT DOCUMENTS

EP 2 657 171 B1 6/2014

* cited by examiner

*Primary Examiner* — Christopher Uhlir
(74) *Attorney, Agent, or Firm* — Burr & Brown, PLLC

(57) ABSTRACT

An elevator system having an elevator car in an elevator shaft and having a measuring tape in the elevator shaft for determining the position of the elevator car in the elevator shaft. The measuring tape is arranged vertically in the elevator shaft and has optical coding for length measurement. At least one marking element which has optical marking is arranged on the measuring tape. The marking element is fixedly arranged on the measuring tape. A sensor device which comprises a lighting source and a sensor which form a detection field for detecting the measuring tape is attached to the elevator car. The elevator system comprises an evaluation device for decoding the codings in the detection field and a control device for controlling the elevator system as a function of the coding and/or of the position of the at least one marking element on the measuring tape.

17 Claims, 4 Drawing Sheets

ELEVATOR SYSTEM HAVING A MEASURING DEVICE FOR DETERMINING A POSITION OF AN ELEVATOR CAR IN AN ELEVATOR SHAFT

This application claims the benefit under 35 USC § 119(a)-(d) of European Application No. 16 165 173.2 filed Apr. 13, 2016, the entirety of which is incorporated herein by reference.

FIELD OF THE INVENTION

The present invention relates to an elevator system having a measuring tape in the elevator shaft for determining the position of the elevator car.

BACKGROUND OF THE INVENTION

Elevator systems of the specified type are known from the prior art. For example, European Patent No. 2 657 171 B1 by the applicant presents an elevator system having a measuring tape for determining the position of the elevator car, in which an element which is fixedly attached to the wall displaceably guides the measuring tape and includes in a display a reference marker relating to the coding of the measuring tape for calibrating the measuring tape. The definition of specific positions in the elevator, referred to as copying, such as the shaft end, door zone, door level, is defined as is known with flags or cams on the wall of the elevator shaft and detected with corresponding sensors on the elevator car.

SUMMARY OF THE INVENTION

The object of the present invention is to make available an improved elevator system.

This object is achieved on the basis of an elevator system of the type mentioned at the beginning by means of an elevator system and by means of a marking element.

The elevator system according to the present invention is an elevator system having an elevator car in an elevator shaft and having a measuring tape in the elevator shaft for determining the position of the elevator car in the elevator shaft. The measuring tape is arranged vertically in the elevator shaft and has optical coding for length measurement. At least one marking element which has optical coding is arranged on the measuring tape. The marking element is fixedly arranged on the measuring tape. A sensor device which comprises a lighting source and a sensor which form a detection field for detecting the measuring tape is attached to the elevator car. The elevator system comprises an evaluation device for decoding the codings in the detection field and a control device for controlling the elevator system as a function of the coding and/or of the position of the at least one marking element on the measuring tape.

The elevator system according to the present invention can provide the advantage that the marking elements can indicate specific positions in the elevator shaft and as a result separate marking devices and sensors for specifying the position (copying) can be dispensed with. The marking elements can be mounted quickly and cleanly, are easy to adjust, economical and do not need to be drilled and screwed to the wall. The marking elements permit an analog sequence during the mounting as during the abovementioned copying, more specifically measuring and attachment, which reduces the expenditure on training the assembly personnel.

The marking element is preferably attached to the measuring tape in a non-displaceable fashion, in particular, in a functionally locking or materially joined fashion. This can provide the advantage that the position is reliably assigned.

The coding of the marking element preferably covers the coding of the measuring tape. This can provide the advantage that the sensor device reliably detects the marking element, and the detection range does not have to be enlarged.

The coding of the marking element preferably has the same code format as the measuring tape. This can simplify the decoding of the marking element and likewise make the production of the marking element less expensive. The coding of the marking element preferably corresponds to a length specification of the code format of the measuring tape. This can make the production of the marking element even less expensive since residual pieces of the measuring tape can be used for the code of the marking element. The value of the coding of the marking element preferably lies outside the length range of the measuring tape, in particular above, in particular above 1 km or 1.5 km. This can increase the reliability of the system even more since the codes of the marking elements can be reliably differentiated from the length specifications of the measuring tape.

The coding of the measuring tape is preferably formed from successive position patterns, in particular, 2D codes. This can provide the advantage that the coding has a high resolution and can be reliably detected.

Position patterns are these smallest units of the code which represent a numerical value. For example, the position pattern is composed of a pattern made of 8×3 black or white squares which result in a 27 bit numerical value. The coding of the measuring tape can be formed here by uninterrupted juxtaposition of the position patterns.

The coding of the marking element is preferably formed from one or more position patterns which are the same in format and arrangement as the position patterns of the measuring tape. This can provide the advantage that the code has a high resolution and can be reliably detected.

The coding of the marking element is preferably different from the value zero. The position pattern or patterns of the marking element preferably does/do not have the value zero. The coding and/or the position pattern or patterns of the marking element preferably are/is not formed exclusively from one color, in particular, not exclusively from white or black elements.

The marking element is preferably embodied as a clip to be fitted over the measuring tape and/or is embodied sealed in order to provide proof of replacement and/or is embodied as an adhesive strip to be stuck onto the measuring tape. This can provide the advantage that the marking element is easy to mount and/or satisfies enhanced safety requirements.

The marking element preferably has a characterization region for sensory identification of its property, in particular, through color, size, shape or labelling. This can provide the advantage that the marking element does not have to be changed by the assembly personnel and can be unambiguously identified in the elevator shaft in terms of its specific property even from a certain distance.

The control device is preferably designed to assign different properties, in particular a permissible maximum speed, an upper or lower shaft end, an upper or lower door zone, or door level to the different examples of coding the marking elements, in particular, by means of a table in a non-volatile memory in the control device. This can provide the advantage that corresponding marking elements can unambiguously define and/or mark the permissible maximum speed and the specified positions in the elevator.

The elevator system preferably has a plurality of marking elements with different examples of coding on the measuring tape, the coding of which marking elements corresponds to coding for which a property is assigned in the control device.

The measuring tape of the elevator system preferably has a marking element for the permissible maximum speed of the elevator car, which marking element is arranged, in particular, under the marking element for the lower shaft end.

For example, the following length values of the coding of a marking element signify the following permissible maximum speed of the elevator system:

1500000-1500010 mm: Maximum speed 1.0 m/s
1500010-1500020 mm: Maximum speed 1.5 m/s
1500020-1500030 mm: Maximum speed 2.0 m/s
1500030-1500040 mm: Maximum speed 2.5 m/s The basis of the definition of the permissible maximum speed, specifically the corresponding marking element on the measuring tape, is therefore connected to the elevator shaft and not to the control. This can provide the advantage, together with a corresponding characterization in the characterization region, that the value of the permissible maximum speed which is applied for this elevator can also be easily identified in the elevator shaft. This can increase the safety of the elevator.

The elevator system preferably has at specific positions on the measuring tape marking elements with a specific property for these positions in the elevator shaft, in particular, for the upper and lower shaft ends, the upper and lower inspection limits, the upper and lower door zones and/or the door levels.

For marking elements which are provided for position specifications, for example, the following length values of the codings of the marking elements signify the following property:

1500410-1500420 mm: Top limit switch (Final Limit Top)
1500430-1500440 mm: Bottom limit switch (Final Limit Bottom)
1500450-1500460 mm: Top inspection limit (Inspection Limit Top)
1500470-1500480 mm: Bottom inspection limit (Inspection Limit Bottom)
1500490-1500500 mm: Inspection Limit top extended (ILTE)
1500510-1500520 mm: Inspection Limit bottom extended (ILBE)

In the delivery state, the control device preferably does not assign any position to the different properties. This can have the advantage that the control does not carry over any incorrect position specifications.

In the delivery state, the control device preferably limits the speed of the elevator car to a specific service speed which is preferably lower than the permissible maximum speed in the normal operating state and is, particularly, preferably 0.6 m/s. This can have the advantage that the elevator system remains in a safety mode before it is completely put into service.

The elevator car preferably travels in a first learning journey with respect to the marking element for the maximum speed, the sensor device detects the coding of the marking element there, the evaluation device determines the value of the coding and the control device stores the determined value as permissible maximum speed in a memory.

The basis of the definition of the maximum speed therefore remains, specifically the corresponding marking element on the measuring tape is connected to the elevator shaft and not to the control. This can have the advantage that an incorrect maximum speed is not used in the case of a new installation or replacement of the control device. This can increase the safety of the elevator.

In the case of a second learning journey of the elevator car via all the marking elements for position specifications, the control device preferably stores the properties of said marking elements which are assigned to their coding and the detected position of the marking elements on the measuring tape in a memory and/or releases the elevator system for normal operation. This permits a simple transfer of the geometry of the elevator shaft into the control.

In the normal operating state, the control device preferably controls the elevator system as a function of the maximum speed, positions and assigned properties which are stored in its memory and have been read in from the marking elements.

The marking element according to the present invention is a marking element with an attachment element for attachment to a measuring tape and having optical coding, wherein the marking element is designed to cover the coding of the measuring tape with its coding after the attachment to the measuring tape and wherein the coding corresponds to a length specification of over 50 m, in particular of over 100 m, in particular of over 500 m, in particular of over 1 km, in particular of over 1.5 km.

This can provide the advantage that the coding of a marking element is not mistaken for a length position of the measuring tape. This can increase the safety of the elevator system.

Further features of the invention are specified in the drawings.

The advantages mentioned in each case can also be implemented for feature combination in whose context they are not specified.

BRIEF DESCRIPTION OF THE DRAWINGS

Exemplary embodiments of the present invention are illustrated in the drawings and are explained in more detail below. Identical reference symbols in the individual figures denote here elements which correspond to one another.

DETAILED DESCRIPTION OF THE INVENTION

Figure 1:
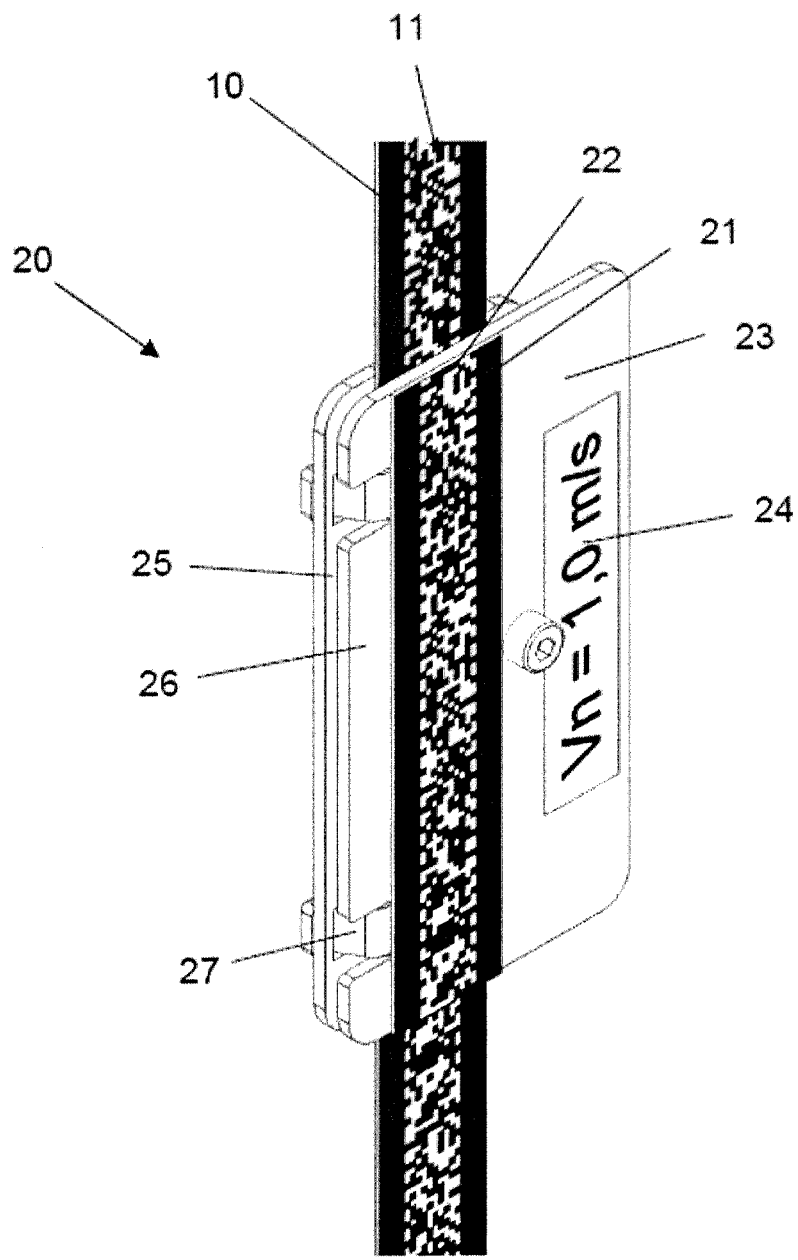
FIG. 1 shows a marking element on the measuring tape of an elevator system.

FIG. 1 shows a marking element 20 on a measuring tape 10 of an elevator system.

The measuring tape 10 is arranged continuously from top to bottom in the elevator shaft at least over the entire travel distance of the elevator car. The measuring tape 10 has on its front side two black edge strips between which optical coding 11 is provided. The coding is composed of position patterns which are adjacent without gap and are made of a matrix of 8×3 black or white squares which represent a 27 bit value which represents a length position for the length measurement and therefore for the determination of the position of the elevator car.

The marking element 20 surrounds the measuring tape 10 in an non-displaceable fashion. The marking part is composed of a rear part behind the measuring tape and a front part over the front side of the measuring tape. A section 21 of the measuring tape is applied to the front side of the marking element in such a way that it is arranged in a line with the measuring tape. The measuring tape section 21 has coding 22 which is also structured like the measuring tape. The coding 22 of the measuring tape section 21 of the marking element 20 has successive position patterns for successive length values of above 1.5 km. The marking element has a characterization region 23 on which the property which is assigned to its coding is written as a marking 24. In the figure shown, this is a specification of the permissible maximum speed of the elevator system of 1.0 m/s.

Figure 2:
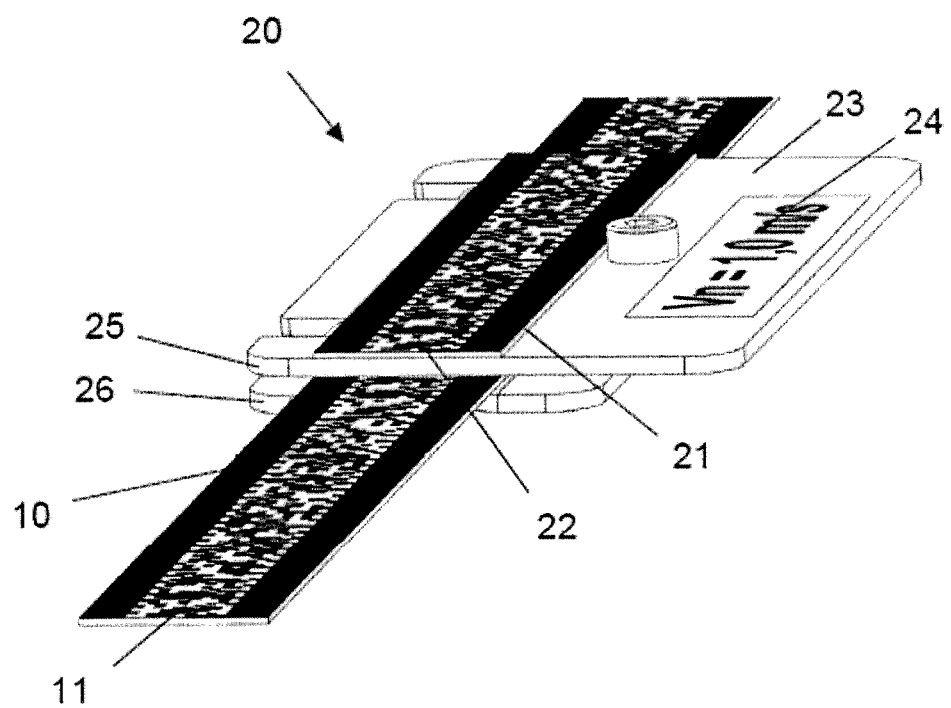
FIG. 2 shows a side view of the marking element with the measuring tape.

FIG. 2 shows the marking element 20 with the measuring tape 10 in a lateral perspective. It is apparent that the coding 22 of the measuring tape section 21 of the marking element 20 covers the coding 11 of the measuring tape 10 precisely.

Figure 3:
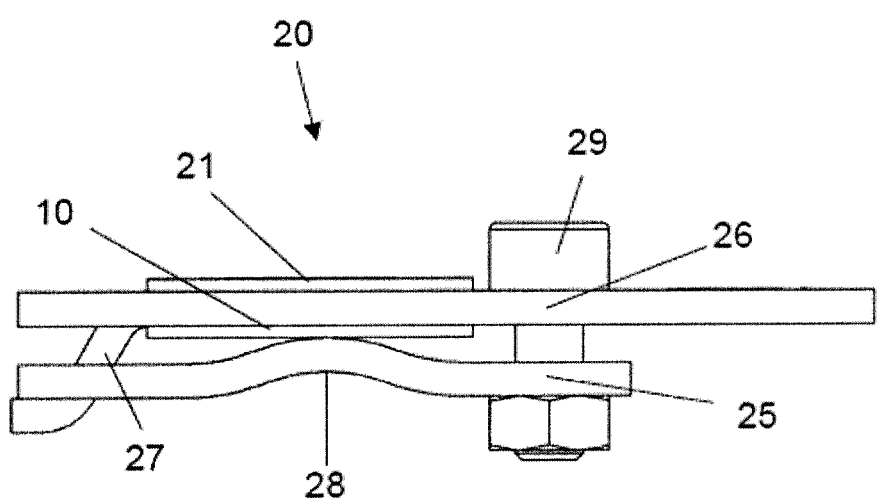
FIG. 3 shows a side view of the marking element with the measuring tape.

FIG. 3 shows the marking element 20 with the measuring tape 10 in a side view. The marking element has a front part 26 which covers the front side of the measuring tape 10 and its coding in a section and which bears the measuring tape section 21. The measuring tape section has precisely the length of the coverage of the measuring tape by the marking element. The rear part 25 of the marking element is held on the front part 26 by a connecting web 27 and a screw 29 and surrounds the measuring tape 10 from the rear. The rear part has a spring element 28 which presses the measuring tape 10 in a non-displaceable fashion against the front part 26.

Figure 4:
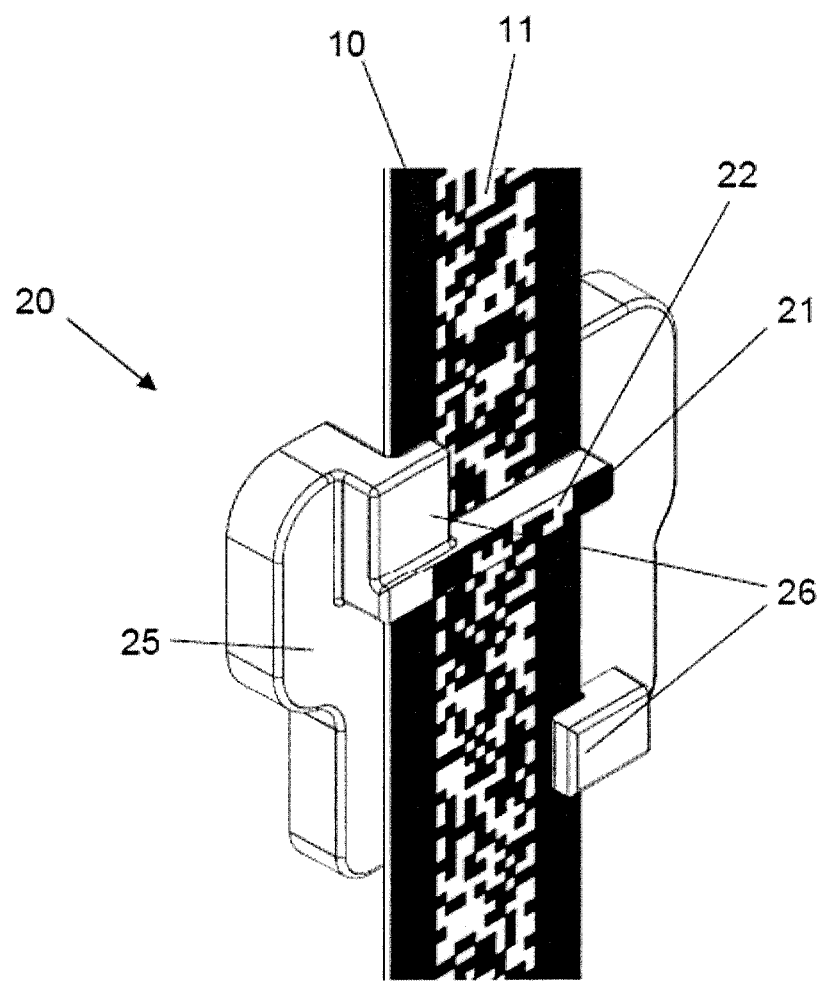
FIG. 4 shows an alternative marking element with the measuring tape.

FIG. 4 shows an alternative embodiment of a marking element 20. The alternative marking element 20 is composed of a rear part 25 and a front part 26 which of 2 securing elements which engage partially over the measuring tape 10 in the lateral direction and a finger web which extends completely over the measuring tape. The alternative marking element 20 is embodied as a clip and can be fitted around the measuring tape 10 by turning it in and it is secured to the measuring tape 10 in a non-displaceable fashion by independent clamping, without screwing. The finger web of the front part 26 bears a measuring tape section 21 with coding 22 which has just the length of a position pattern. The position pattern is constructed in the same format as the position patterns of the measuring tape 10 and represents a length value of above 1.5 km.

LIST OF REFERENCE NUMBERS

10 Measuring tape
11 Coding
20 Marking element
21 Measuring tape section
22 Coding
23 Marking region
24 Marking
25 Rear part
26 Front part
27 Connecting web
28 Spring element
29 Screw

The invention claimed is:

1. An elevator system having an elevator car in an elevator shaft comprising:
   a measuring tape for determining a position of the elevator car in the elevator shaft, which is arranged vertically in the elevator shaft, and has optical coding for length measurement;
   at least one marking element that is arranged on the measuring tape and has optical coding;
   a sensor device which is attached to the elevator car and comprises a lighting source and a sensor which form a detection field for detecting the measuring tape;
   an evaluation device for decoding the codings in the detection field; and
   a control device for controlling the elevator system as a function of the at least one marking element,
   wherein the at least one marking element is fixedly arranged on the measuring tape,
   wherein the optical coding of the at least one marking element has a same format as a format of the measuring tape,
   wherein the optical coding of the at least one marking element corresponds to a length specification, and
   wherein the optical coding of the at least one marking element has a value outside a length range of the measuring tape.

2. The elevator system according to claim 1, wherein the at least one marking element is attached to the measuring tape in a non-displaceable fashion.

3. The elevator system according to claim 1, wherein the coding of the at least one marking element covers the coding of the measuring tape.

4. The elevator system according to claim 1, wherein the coding of the measuring tape is formed from a plurality of successive position patterns.

5. The elevator system according to claim 4, wherein the coding of the at least one marking element is formed from one or more position patterns which are the same in format and arrangement as the position patterns of the measuring tape.

6. The elevator system according to claim 1, wherein the at least one marking element is embodied as a clip to be fitted over the measuring tape, and/or is embodied to be sealed in order to provide proof of replacement and/or is embodied as an adhesive strip to be stuck onto the measuring tape.

7. The elevator system according to claim 1, wherein the at least one marking element has a characterization region for sensory identification of a property thereof through color, size, shape or labelling.

8. The elevator system according to claim 1, wherein the control device assigns different properties selected from a permissible maximum speed, an upper or lower shaft end, an upper or lower door zone, or door level to different examples of coding the at least one marking element by means of a table in a non-volatile memory in the control device.

9. The elevator system according to claim 1, wherein the elevator system
   has a plurality of marking elements with different examples of coding on the measuring tape, the coding of which marking elements corresponds to coding for which a property is assigned in the control device, and/or
   has on the measuring tape a marking element for a permissible maximum speed of the elevator car, which marking element is arranged under a marking element for a lower shaft end, and/or
   has at specific positions on the measuring tape marking elements with a specific property for these positions in the elevator shaft selected from an upper shaft end and the lower shaft end, upper and lower inspection limits, upper and lower door zones and/or door levels.

10. The elevator system according to claim 1, wherein in a delivery state the control device does not assign any position to different properties of the coding and/or limits a speed of the elevator car to a specific service speed.

11. The elevator system according to claim 1, wherein
in a first learning journey of the elevator car with respect to a marking element for a maximum speed, the control device stores the maximum speed detected from a coding of said marking element in a memory, and
in a second learning journey via all marking elements for position specifications, the control device stores a property of said marking elements which is assigned to their code and an assigned detected position of the marking elements on the measuring tape in a memory and/or releases the elevator system for normal operation, and/or
in a normal operating state, the control device controls the elevator system as a function of the maximum speed, positions and assigned properties which are stored in its memory and have been read in from the marking elements.

12. A marking element with an attachment element for attachment to a measuring tape of an elevator system and having optical coding, wherein a marking element is designed to cover a coding of the measuring tape with its coding after the attachment to the measuring tape, and the coding of the marking element corresponds to a length specification of over 50 m, over 100 m, over 500 m, over 1 km, or over 1.5 km,
wherein the coding of the marking element has a same format as a format of the measuring tape, and
wherein the coding of the marking element has a value outside a length range of the measuring tape.

13. The elevator system according to claim 2, wherein the at least one marking element is attached to the measuring tape in a functionally locking or materially joined fashion.

14. The elevator system according to claim 1, wherein the coding of the at least one marking element has a value above the length range of the measuring tape by 1 km or 1.5 km.

15. The elevator system according to claim 4, wherein the successive position patterns are 2D codes.

16. The elevator system according claim 11, wherein in a delivery state the control device limits the speed of the elevator car to a speed lower than a permissible maximum speed in the normal operation state.

17. The elevator system according claim 10, wherein in the delivery state the control device limits the speed of the elevator car to 0.6 m/s.

* * * * *